United States Patent [19]

Needles

[11] Patent Number: 4,899,305

[45] Date of Patent: Feb. 6, 1990

[54] MANCHESTER CARRY ADDER CIRCUIT

[75] Inventor: William M. Needles, Arlington, Tex.

[73] Assignee: National Semiconductor Corp., Santa Clara, Calif.

[21] Appl. No.: 207,322

[22] Filed: Jun. 15, 1988

[51] Int. Cl.[4] .............................................. G06F 7/50
[52] U.S. Cl. ..................................... 364/787; 364/786
[58] Field of Search .................................. 364/784–788

[56] References Cited

U.S. PATENT DOCUMENTS

| | | | |
|---|---|---|---|
| 4,052,604 | 10/1977 | Maitland et al. | 364/786 |
| 4,523,292 | 6/1985 | Armer | 364/786 |
| 4,564,921 | 1/1986 | Suganuma | 364/784 |
| 4,651,296 | 3/1987 | Koike | 364/784 |
| 4,707,800 | 11/1987 | Montrone et al. | 364/788 |
| 4,807,176 | 2/1989 | Yamada et al. | 364/786 |

*Primary Examiner*—Gary V. Harkcom
*Assistant Examiner*—Tan V. Mai
*Attorney, Agent, or Firm*—Limbach, Limbach & Sutton; Lee Patch

[57] ABSTRACT

A 16-bit adder architecture configured uniquely as two 8-bit adders. The first 8-bit adder uses a static technique to perform addition of the least significant bits and a dynamic technique to perform addition on the remaining bits. The second 8-bit adder uses a static technique to perform addition of the most significant bits and a dynamic technique to perform addition on the remaining bits. The two 8-bit adders are combined at the most significant bit of the first adder and the least significant bit of the second adder using the carry out of the first adder and the carry in of the second adder. A static logic gate is used to logically combine and correctly time the combination of the two 8-bit adders into a single, high-speed 16-bit adder.

6 Claims, 3 Drawing Sheets

MANCHESTER CARRY ADDER CIRCUIT

BACKGROUND OF THE INVENTION

1. Field of the Invention

The present invention relates to a dynamic adder with Manchester carry architecture that provides improved generate function control.

2. Discussion of the Prior Art

Computational processes can be performed by electrical circuits which are combinations of basic binary units such as flip-flops, AND gates, OR gates and invertors. Thus, while circuits can be designed to perform addition, adder circuits are much more complicated than most computational circuits because of the "carry" problem.

High speed, digital systems perform addition on parallel words of typically 8 to 64 bits. The result of an addition at any bit position depends not only on the two operand bits in that position but also on the result of the addition of the less significant operand bits. More specifically, the result depends on the "carry" from the less significant bit positions.

In general mathematical terms, the addition process for bit position n+1 of terms A and B involves adding the operands $A_n+1$ and $B_n+1$ and the carry $C_n$. The result is a digit for the sum and possibly a digit to be carried, i.e. carry $C_n+1$ Thus, for example, a 4-bit adder has inputs $A_1A_2A_3A_4$, $B_1B_2B_3B_4$ and carry-in $C_n$; it provides outputs $\Sigma_1\Sigma_2\Sigma_3\Sigma_4$ and carry-out $C_n+4$.

In the simplest adder scheme, ripple carry addition, each bit position receives a potential carry input from the less significant position and passes a potential carry on to the more significant position. The worst-case delay for the addition of two n-bit numbers using the ripple carry method is n−1 carry delays plus one sum delay. Thus, the ripple carry technique uses a minimum amount of circuitry, but is rather slow.

Addition can be made much faster if more logic is used at each bit position to anticipate the carry into this position instead of waiting for a ripple carry to propagate through all the lower positions. An adder designed to include carry anticipation is called a carry lookahead adder.

Adder carry delay grows linearly with the size of the input word. Carry lookahead adders improve this delay by calculating the carry to each stage of the adder in parallel.

The carry of the ith stage, $C_i$, may be expressed as $$C_i = G_i + P_i \cdot C_{i-1} \quad (1)$$

where $$G_i = A_i \cdot B_i \text{ generate signal.} \quad (2)$$

$$P_i = A_i \oplus B_i \text{ propagate signal.} \quad (3)$$

Expanding this yields $$C_i = G_i + P_iG_{i-1} + P_iP_{i-1}G_{i-2} + \ldots + P_i \ldots P_iC_0. \quad (4)$$

The sum $S_1$ is generated by $$\begin{aligned} S_i &= C_{i-1} \oplus A_i \oplus B_i \\ &= C_{i-1} \oplus P_i. \end{aligned} \quad (5)$$

It is clear from the above that the size of the gates needed to implement this carry lookahead scheme can become quite large. As a result, the number of stages of lookahead is usually limited. For four stages of lookahead, the appropriate terms are $$C_1 = G_1 + P_1C_0$$

$$C_2 = G_2 + P_2G_1 + P_2P_1C_0$$

$$C_3 = G_3 + P_3G_2 + P_3P_2G_1 + P_3P_2P_1C_0$$

$$C_4 = G_4 + P_4G_3 + P_4P_3G_2 + P_4P_3P_2G_1 + P_4P_3P_2P_1C_0.$$

A possible implementation of a carry gate for this kind of carry lookahead adder for 4 bits is shown in FIG. 1. Note that the gates have been partitioned to keep the number of inputs less than or equal to four. The circuit and layout for this design are quite irregular. The carry-out term $C_4$ may be expressed as $$C_4 = G_4 + P_4 \cdot (G_3 + P_3 \cdot (G_2 + P_2 \cdot (G_1 + P_1 \cdot C_0))) \quad (6)$$

This function may be implemented as a domino CMOS gate, as shown in FIG. 2. Carry $C_1$-$C_3$ are generated similarly. Note that the worst-cast delay path in this circuit has six N-channel transistors in series.

The efficiency of the domino carry chain shown in FIG. 2 can be enhanced by precharging at appropriate points. The elemental circuit for accomplishing this is shown in FIG. 3A. Operation of the FIG. 3A circuit proceeds as follows. When CLOCK is low, the output node is precharged by the P-channel pull-up transistor. When CLOCK goes high, the N-channel pull-down transistor turns on. If carry generate (A·B), i.e. signal G, is true, then the output node discharges. If carry propagate (A $\oplus$ B) is true, then a previous carry may be coupled to the output node, conditionally discharging it.

A 4-bit adder can be constructed by cascading four such stages and constructing the circuitry to supply the appropriate signals. This is commonly called a Manchester carry adder. Thus, a 4-bit Manchester carry adder would be constructed as shown in FIG. 3B. The adder circuit shown in FIG. 3B is similar to the domino carry circuit shown in FIG. 2. However, the intermediate carry gates are no longer needed since the carry values are available in a distributed fashion. As further shown in FIG. 3B, if all propagate signals are true, and C is high, six series N-channel transistors pull the output node down. Thus, the worst-case propagation time can be improved by bypassing the four stages if all carry propagate signals are true.

SUMMARY OF THE INVENTION

The present invention provides a 16-bit adder architecture configured uniquely as two 8-bit adders. The first 8-bit adder uses a static technique to perform addition of the least significant bits and a dynamic technique to perform addition on the remaining bits. The second 8-bit adder uses a static technique to perform addition of the most significant bits and a dynamic technique to perform addition on the remaining bits. The two 8-bit adders are combined at the most significant bit of the first adder and the least significant bit of the second adder using the carry-out of the first adder and the carry-in of the second adder. A static logic gate is used to logically combine and correctly time the combination of the two 8-bit adders into a single, high-speed 16-bit adder.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

Figure 1:
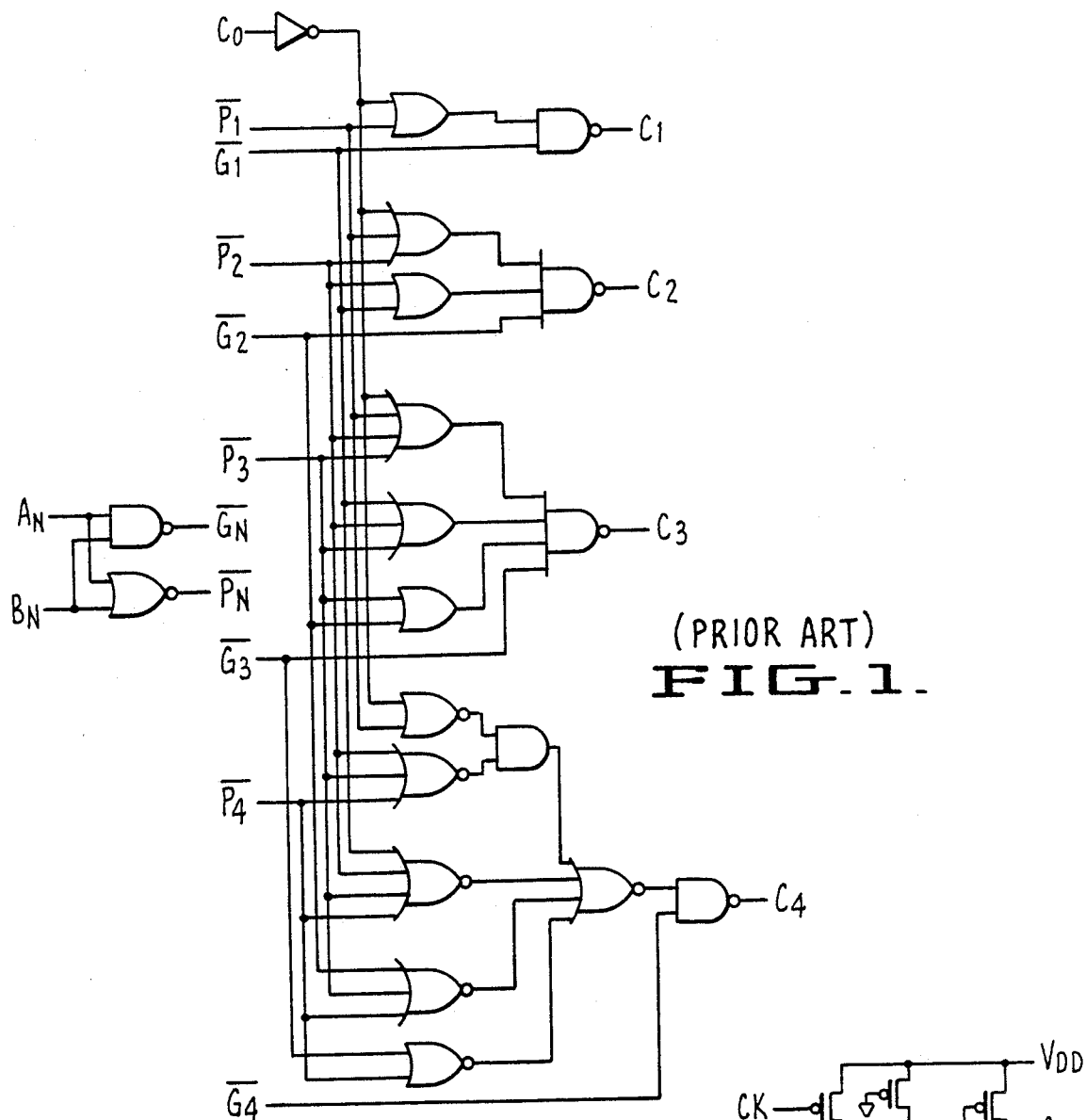
FIG. 1 is a logic diagram illustrating a conventional 4-bit carry lookahead adder.
Figure 2:
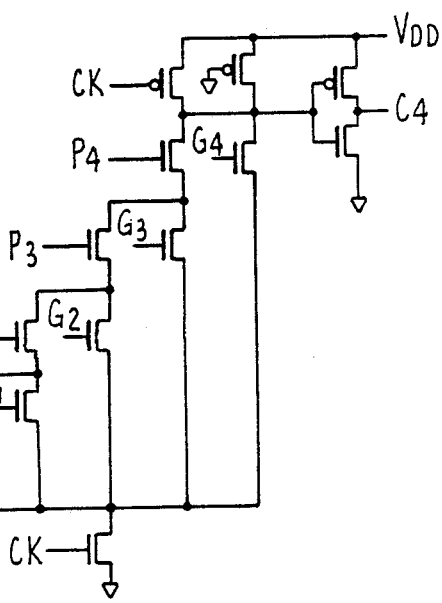
FIG. 2 is a schematic diagram illustrating a conventional domino carry chain.
Figure 3A:
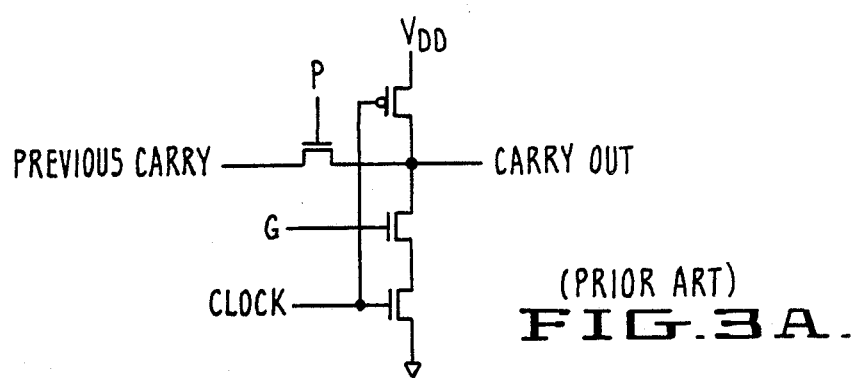
FIG. 3A is a schematic diagram illustrating an elemental circuit of a conventional Manchester carry adder.
Figure 3B:
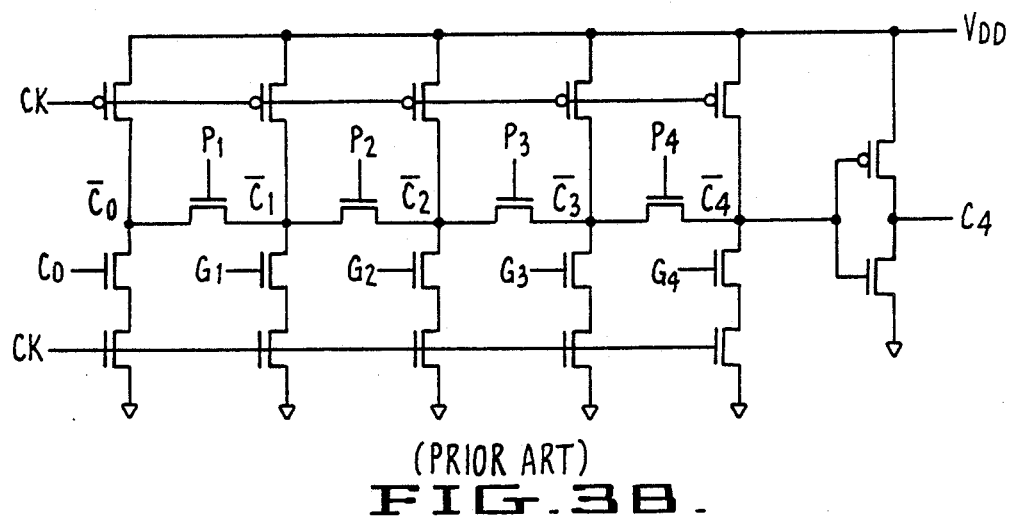
FIG. 3B is a schematic diagram illustrating a conventional 4-bit Manchester carry adder.

As stated above, FIGS. 3A and 3B show conventional carry chain adder core circuitry. According to this architecture, the source of each N-channel device utilized for the adder generate function (G1-4) is controlled by another series-connected N-channel device the source of which is tied to ground and the gate of which is controlled by the clock source (CK). Thus, this conventional configuration requires two propagation delays to discharge the carry output node.

Figure 4:
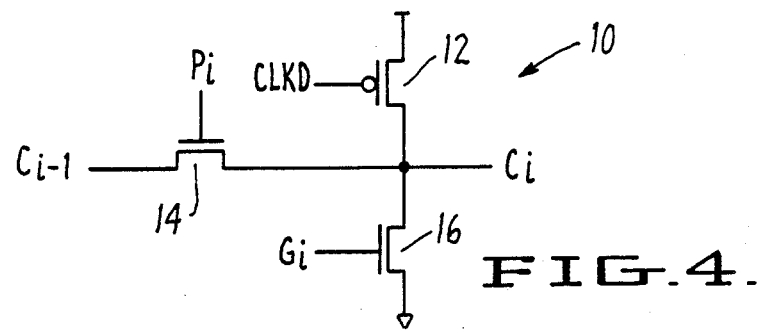
FIG. 4 is a schematic diagram illustrating an elemental circuit of a Manchester carry adder in accordance with the present invention.

Referring to FIG. 4, the present invention provides an elemental adder circuit 10 that includes a P-channel pull-up transistor 12 that, as in the case of the conventional core circuit, precharges the carry output node $C_i$ when the clock CLKD is low. Also, as in the conventional circuit, an N-channel device 14 passes the previous carry $C_{i-1}$ to the carry out node $C_i$ based on the state of propagate signal $P_i$. However, in accordance with the present invention, the adder generate device 16 has its source tied directly to ground, eliminating the extra clock-driven N-channel pull-down device found in the conventional architecture. Thus, only one propagation delay is required to discharge the carry out node $C_i$.

Figure 4A:
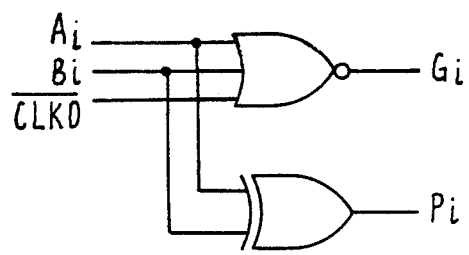
FIG. 4A is a simple logic diagram illustrating the input logic of the elemental circuit shown in FIG. 4.

As shown in FIG. 4A, the control signal $G_i$ for the generate device 16 is provided by the NOR gating of the operand bits $A_i$ and $B_i$. The carry propagate signal is provided by the XOR gating of bits $A_i$ and $B_i$. Thus, if $A_i$ and $B_i$ are both "0" or both "1", then the carry out $C_i$ will be "0" or "1", respectively; device 14 will be "off" with propagate signal $P_i$ low. However, if the $A_i$ and $B_i$ values are "10" or "01", then $P_i$ will be high causing the previous carry $C_{i-1}$ to be passed to the carry out node $C_i$ via the Manchester series propagate device 14.

Figure 5:
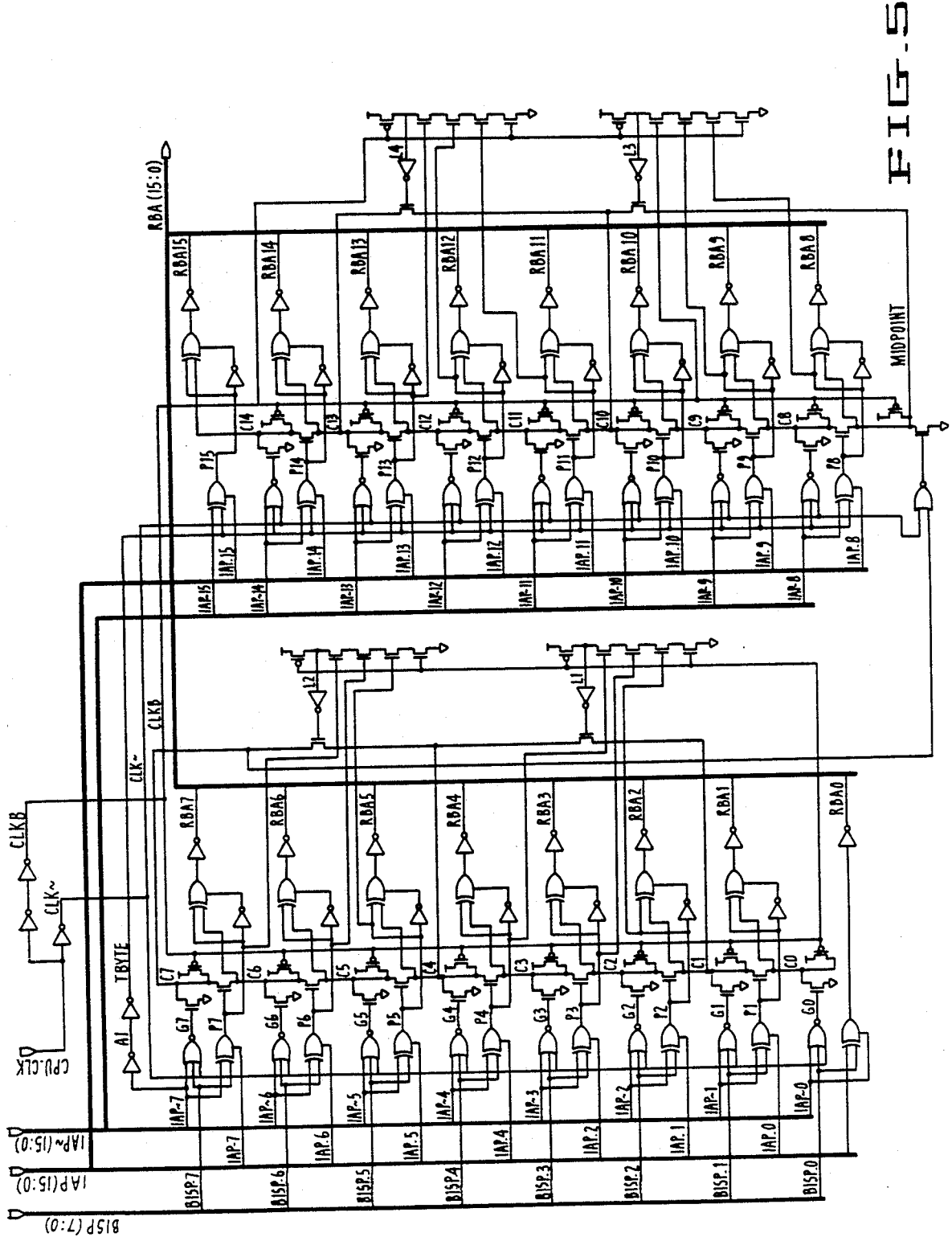
FIG. 5 is a schematic diagram illustrating a 16-bit dynamic Manchester carry adder in accordance with the present invention including carry lookahead circuitry.

FIG. 5 shows a 16-bit dynamic adder with Manchester carry architecture that utilizes 15 cascaded groups of elemental circuits and associated logic as described above in conjunction with FIGS. 4 and 4A.

The adder shown in FIG. 5 is configured as two 8-bit adders, each having a unique architecture.

The first 8-bit adder (bits 0-7) uses a static technique to perform addition of the least significant bit of the two operands and a dynamic technique to perform addition on the remaining 7 bits. Static operation is possible for the least significant bit since no carry-in capability is provided at this bit position.

The terms "static" and "dynamic" are used in this description in accordance with their conventional meaning. That is, "static" refers to a technique wherein changes in the output are dependant solely upon changes in the logic inputs; no clock signal is provided. "Dynamic" refers to a technique wherein changes in the output depend not only upon changes in the logic inputs, but also upon the transitions of an associated clock signal.

The second 8-bit adder (bit 8-15) uses a static technique to perform addition of the most significant bits and a dynamic technique to perform addition on the remaining 7 bits. Static operation is possible for the most significant bit since no carry out capability is provided at this bit position. Additionally, the second adder performs an 8-bit addition on a calculated 8-bit byte and a machine coded 8-bit byte. This machine coded byte is formed by the TBYTE signal.

Each of the two 8-bit adders also includes carry look ahead circuitry. This circuitry consists of two discrete collections 10 of series-connected N-channel devices which subjugate the effect of the serial transistor chains found in the adder carry chain.

Finally, the two 8-bit adders are combined at the most significant bit of the first adder and the least significant bit of the second adder using the carry-out of the first adder and the carry-in of the second adder. A static logic gate is used to logically combine and correctly tie the combination of the two adders into a single, high-speed 16-bit adder.

It should be understood that the invention is not intended to be limited by the specifics of the above-described embodiment, but rather defined by the accompanying claims.

What is claimed is:

1. A Manchester carry adder circuit of the type that includes a plurality of series-connected elemental adder circuits for performing addition of bit position $n+1$ of N-bit terms A and B by adding the operands $A_{n+1}$ and $B_{n+1}$ and the carry $C_n$ from the previous bit position n to produce a sum digit and a possible carry-out digit $C_{n+1}$ for carry to the subsequent bit position $n+2$, the circuit comprising
   (a) a first x bit adder that uses a static technique to perform addition of the least significant bit of the terms A and B and a dynamic technique to perform addition on the remaining $x-1$ bits;
   (b) a second N-x bit adder that uses a static technique to perform addition on the most significant bit of the terms A and B and a dynamic technique to perform addition on the remaining $N-x-1$ bits; and
   (c) means for combining the first and second adders at the most significant bit of the first adder and the least significant bit of the second adder using the carry-out $C_x$ of the first adder and the carry-in of the least significant bit position of the second adder.

2. A Manchester carry adder as in claim 1 wherein $N=16$ and $x=8$.

3. A Manchester carry adder as in claim 1 wherein each elemental adder circuit except that for the least and most significant bit positions of terms A and B comprises
   (a) a carry output node;

(b) pull-up means connected between a positive supply and the carry output node for charging the carry output node in response to a clock signal;

(c) pull-down means connected directly between the carry output node and ground for discharging the carry output node in response to a carry generate signal; and (d) carry propagate means connected to the carry output node for providing a carry-in to the carry output node in response to a carry propagate signal.

4. A Manchester carry adder as in claim 3 wherein the pull-down means consists of an N-channel transistor its source connected directly to ground, its drain connected to the carry output node and its gate connected to receive the carry generate signal.

5. A Manchester carry adder as in claim 1 wherein the means for combining includes a static logic gate for logically combining and correctly timing the combination of the first and second adders.

6. A Manchester carry adder as in claim 1 wherein each of the first and second adders includes carry look ahead circuitry.

* * * * *

UNITED STATES PATENT AND TRADEMARK OFFICE
CERTIFICATE OF CORRECTION

PATENT NO. : 4,899,305
DATED     : 2/6/90
INVENTOR(S): William M. Needles

It is certified that error appears in the above-identified patent and that said Letters Patent is hereby corrected as shown below:

Col. 1, line 26, "$A_n+1$ and $B_n+1$" should be --$A_{n+1}$ and $B_{n+1}$--.

Col. 1, line 28, "$C_n+1$ Thus," should be --$C_{n+1}$. Thus--.

Col. 1, line 30, "$C_n+4$" should be --$C_{n+4}$--.

Col. 4, line 13, "(bit 8-15)" should be --(bits 8-15)--.

Col. 4, line 42, "An+1" should be --$A_{n+1}$--.

Signed and Sealed this

Twenty-second Day of January, 1991

Attest:

HARRY F. MANBECK, JR.

*Attesting Officer*      *Commissioner of Patents and Trademarks*